Figure 1:
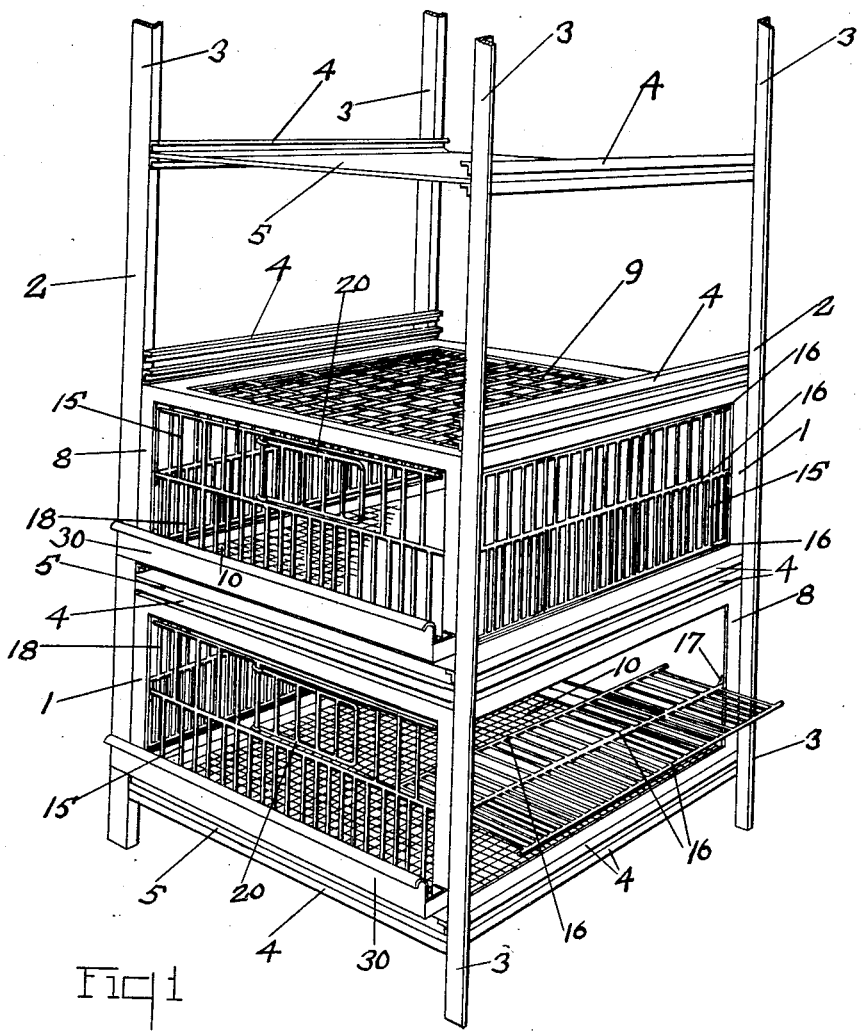

Oct. 29, 1929.　　　S. M. McCURDY　　　1,733,382
CHICK RAISING COOP
Filed April 21, 1928　　　2 Sheets-Sheet 1

Inventor
Sanford M. McCurdy
By Faust F. Crampton
Attorney

Oct. 29, 1929.   S. M. McCURDY   1,733,382
CHICK RAISING COOP
Filed April 21, 1928   2 Sheets-Sheet 2
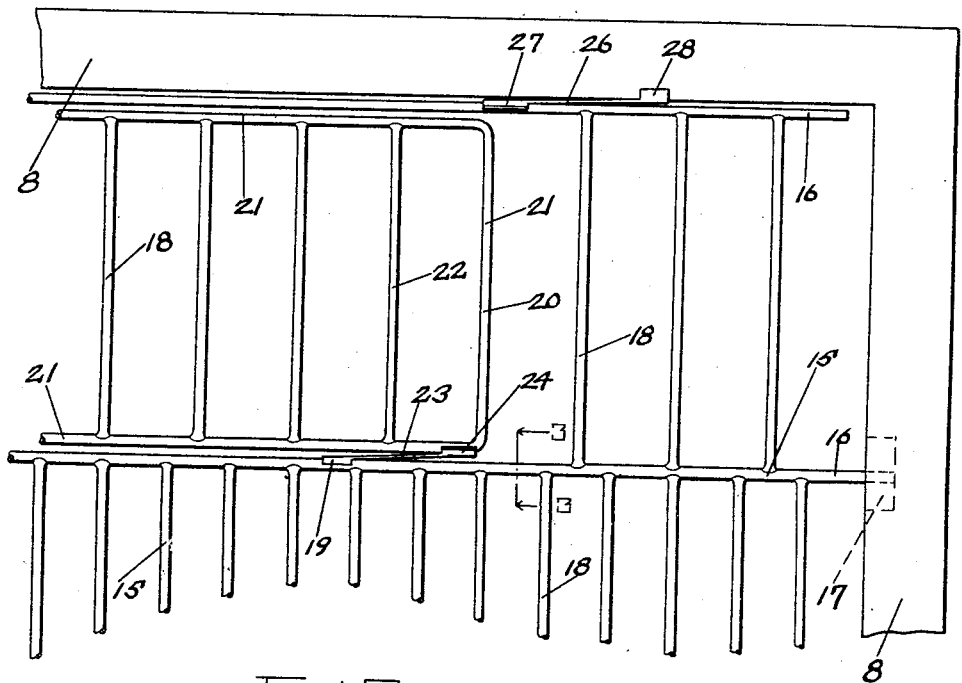
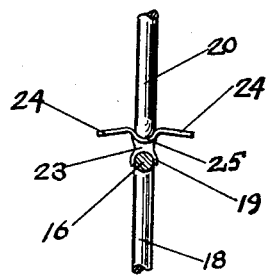
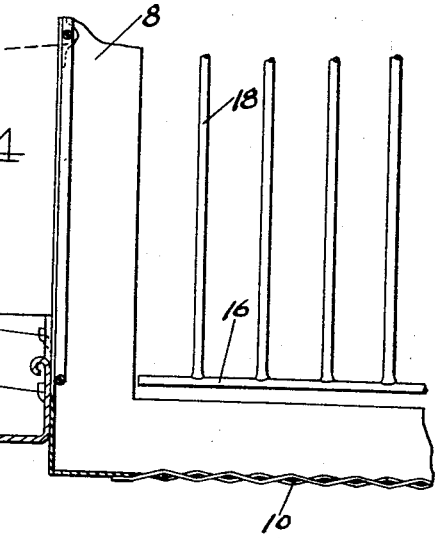
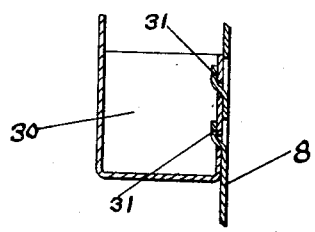
Inventor
Sanford M. McCurdy
By
Attorney Patented Oct. 29, 1929

1,733,382

UNITED STATES PATENT OFFICE

SANFORD M. McCURDY, OF ADA, OHIO

CHICK-RAISING COOP

Application filed April 21, 1928. Serial No. 271,782.

My invention has for its object to provide a sectional coop for raising chicks whereby a large number of chicks may be subdivided into groups, each group containing as many chicks as may be cared for without being unduly crowded and trampled upon by others and which will enable a closer attention to the individual conditions of the chicks by the caretaker. Preferably, the sections of the coop are so constructed that they may be used for feeding and exercising the smaller size chicks and thereafter for containing the chicks as they increase in size and until they reach that stage where they may be referred to as full grown chickens. Also, if desired, the broilers may be retained in the coop where they may be fattened by the usual feeding processes or methods and limited in their exercise by the dimensions of the sections of the coop. The same is true with reference to older hens which have passed through their efficient laying periods.

In the preferred form of the invention, the sections are made in the form of crates and supported in frames which arrange the crates in tiers whereby space will be economized and the chicks will be efficiently cared for. Consequently, the invention provides a chick raising coop comprising a plurality of crates wherein the chicks may be shipped to market after having been raised to full size or fattened for the market. Also, the older chickens that are to be prepared for the market, may be fed to an extreme weight and then shipped in the crates.

The invention may be contained in structures of different forms, and, to illustrate a practical application of the invention, I have selected a chick raising coop that contains the invention as an example of such structures, and shall describe it hereinafter. The chick raising coop referred to is shown in the accompanying drawings.

Fig. 1 illustrates a perspective view of the frame and crates embodying my invention. Fig. 2 is an enlarged view showing the details of the construction of one of the sides of a crate. Fig. 3 illustrates a view of a section taken along the plane of the line 3—3 illustrated in Fig. 2 and shows a latch for securing a door of the wire crate in closed position. Fig. 4 is a view of a section of a part of one of the crates. Fig. 5 illustrates a sectional view showing a method of supporting a feed box on one of the crates.

The crates or sections 1 of the coop are supported in a frame 2. Preferably, four or five crates or sections 1 are located in a single frame 2, and as many frames as may be desired may be used for raising a flock of chicks, the number, of course, depending on the size of the flock. The frame 2 is, preferably, formed of angle iron, having the four uprights 3 and a plurality of cross bars 4. The bars 4 are located in parallel relation and between the uprights 3. On two opposite sides of the frame 2 the bars 4 are located in pairs that are spaced apart substantially the height of a crate or section 1. The lower bar 4 of each pair may extend around the frame 2 so as to offer a solid support for the crates or sections 1. The crates or sections 1 are supported by the upper of each of the bars of angle irons 4 and so that a crate or section 1 may be slid into position between and supported by the uprights 3. The lower of each bar of the angle irons 4 is used for supporting a dropping board or pan 5 which is located under each of the crates or sections 1. The dropping boards or pans 5 may be likewise slidably removed for the purpose of cleaning and for shifting their positions beneath the crates or sections 1.

The frame work 8 of the crates or sections 1 may also be formed of angle iron. The top and bottom of each crate or section 1 is formed of wire mesh 9 and 10. The mesh 9 of one being larger than the mesh 10 of the other and so that, if desired, the crate 1 may be inverted and used for larger chicks or when the smaller chicks have grown to a considerable size, and so that the feet of the chicks may be properly supported and yet the droppings may readily pass through the wire mesh that forms the bottom in either case. When the chicks are small in size, the finer mesh wire 10 forms the floor of the crate or section 1 and, as the chicks grow in size, and their droppings become larger, the crate or section 1 is inverted and the larger wire mesh 9 will be used as the floor of the crate or section 1.

The sides of the crates or sections 1 are so formed as to provide openings through which the chicks or chickens may be fed and so that feeding troughs may be located on the outside of the crates or sections 1. Preferably, the sides are so formed that smaller openings will be provided for the chicks and larger openings will be provided for the larger chicks or when they have grown to substantially full size chickens. In the particular form of construction shown, the sides 15 are formed of a plurality of parallel wires 18 that extend vertically and are so spaced relative to each other as to afford different sizes of openings to enable the chicks or chickens to feed from receptacles supported on the exterior of the crates or sections 1. If desired, the sides 15 may be substantially fixed or permanently secured with reference to the crate or section 1 and the smaller size openings located near the side of the crate or section 1 which has the finer wire mesh, such as the mesh 10, and the larger openings near that side of the crate or section 1 which has the larger mesh 9. The finer mesh 10 being so formed as to properly support the smaller chickens and enables, nevertheless, the droppings to pass through to the dropping board or pan 5, while the larger mesh 9 will properly support the larger chickens and also enable droppings to pass through the mesh to the dropping board or pan 5. Thus, when the chickens increase in size, the crates or sections 1 may be inverted.

In the particular form of construction shown, the sides 15 of the crate or section 1 are rotatably supported so that they may be inverted. They are, preferably, secured so that they may be rotated when desired, and so as to locate the larger size openings, either in proximity to the side of the crate or section 1 having the finer mesh 10, or the side of the crate or section 1 having the larger mesh 9. Thus, the larger, and consequently the smaller openings, may be used in conjunction with the floor formed of the finer mesh 10 and vice versa with respect to the side having the larger mesh 9. The sides 15 are formed of three horizontally extending parallel wires 16. The central wire 16 of each side 15 is, preferably, made longer than the other wires 16 and is pivotally supported at its end portions in brackets 17 that are secured to the frame work 8 of the crate or section 1, whereby the side 15 may be rotated in the brackets 17 and, consequently, may be inverted when desired. The parallel wires 16 are connected together and by the vertical wires 18 which are spot welded at their ends to the wires 16. The wires 18, located on one side of the central wires 16, are spaced closer together than the wires 18 located on the other side of the central wires 16, whereby the openings, that is, the spaces between the wires 18 on one side of the central wire 16, will be such that the smaller chicks may feed through the sides 15 and the openings will not be so large that they will permit the chicks to pass through the sides 15, as between the wires 18. The wires 18, located on the opposite side of the central wires 16, are, however, placed farther apart in order that the full grown chickens may insert their heads between the wires and feed from troughs or other containers located exterior to the crate or section 1 of which the sides 15 form a part, when the sides 15 have been inverted, or the section or crate itself has been inverted, so as to locate this portion of the side of the crate or section 1 in proximity to the bottom of the crate or section 1.

If desired, a door or gate 20 may be formed in one or more of the sides 15 of the crate or section 1. Preferably, the door or gate 20 is also formed of wire. It may be provided with an edge wire 21 and parallel wires 22 that are connected to the portions of the edge wire 21 that form the upper and lower edges of the door or gate by spot welding the ends of the wires 22 to the said portions of the edge wire 21. The door or gate 20 may be pivotally connected to one of the parallel wires 18, the ends of the edge wire 21 being looped around one of the wires 18. The latch 23, for securing the door or gate 20, may be located on one of the wires 16, such as the central wire 16, and spring pressed so as to frictionally and yieldingly engage the edge wire of the gate 20. The particular latch 23, shown in the drawings, is formed from an elastic metal strip that may be spot welded or soldered to the central wire 16, as at 19. The latch 23 is provided with a pair of wings 24 that may be operated with the thumb or finger to depress the latch 23 or raise the latch 23 according to the position of the side 15 in order to release the gate 20. Preferably, the latch 23 is provided with a recess portion 25 located intermediate the wings 24, and the wings 24 slope from the edges of the recess portion 25 and so that when the door or gate 20 is closed, it will engage one of the wings 24 and depress the latch 23 until it reaches the recess 25 when the free end of the latch 23 will be raised by the elasticity of the latch 23 and thus engage the edge wire 21 of the door or gate 20 in the recess 25 of the latch 23. A similar latch 26 may also be used for securing each side 15 in position with reference to the frame work 8 of the crate or section 1. The latch 26 may be spot welded or soldered to one of the outer wires 16 of the side, as at 27, and the wings 28 of the latch may be engaged to depress the latch 26 and release it from engagement with the edge of the angle iron of the frame work 8 of the crate or section 1, which is normally located in a recess, similar to that of the recess 25 of the latch 23, when the side 15 is located in the plane of the side of the frame of the crate or section 1.

Each crate or section 1 may be provided with a feed box and water box, such as the feed box 30, that may be attached by any suitable means. In the particular construction shown in the drawings, the angle irons forming the vertical edges of the frame work 8 are provided with hooks 31 that are adapted to extend through or engage a side wall of the feed box 30. Thus the feed box 30 may be readily removed to permit refilling or cleaning.

Thus, by my invention, I have provided an exceedingly efficient means for raising chicks or for fattening chickens for the market, that may be used for confining the chickens and which may be readily manipulated and shifted with reference to other parts, and thus may be readily handled or stored, or may be located in different parts of a building for classification of chicks or chickens, and wherein the chicks or chickens may be kept until they are ready for shipment to market and may be shipped to market within the containers.

I claim:

1. An invertible chick raising coop having two sides formed of wire mesh, the mesh of one being different in size from the mesh of the other and for allowing droppings of chickens of different sizes to work therethrough when either side is the bottom of the coop, a third side joining the first named sides and having two sets of openings along the edges that join the said first named sides, the size of the openings of the set adjoining the side of the first named sides having the smaller mesh being smaller in size than the openings of the other named set.

2. A coop for raising chickens, one of the sides of the coop having two sets of openings, one set located near the bottom and the other set located near the top, the width of the openings of one set being less than the width of the opening of the other set, and a feeding trough located exterior to the coop and in proximity to the openings and means, for rotatably supporting the sides to locate one or the other of the sets of the opening in proximity to the trough.

3. A chick raising coop, having one side formed of two sets of bars, one set of bars being located closer to each other than the other set of bars, and a feed trough located exterior to the coop and in proximity to the bars, and means for supporting the side in the coop for rotation about a horizontal axis extending substantially through the center of the side.

4. A chick raising coop having a frame, a side means for rotatably supporting the side in the frame, the side having openings extending along its upper and lower edges, the size of the openings along one edge being smaller than the size of the openings along the other edge, the top and bottom of the coop formed of wire mesh, the size of the mesh of one being smaller than the size of the mesh of the other, and a feed box located in proximity to the lower edge of the side of the coop.

5. In a chick raising coop, a frame, a plurality of sections slidably supported in the frame, each section having a top and bottom formed of wire mesh of different sizes, and a side having openings of different widths located along its upper and lower edges, means for rotatably supporting the side about a horizontal axis in the section, a feed box located exterior to and in proximity to the lower edge of each section, and a dropping board slidably supported on the frame and located below each section.

In witness whereof I have hereunto signed my name to this specification.

SANFORD M. McCURDY.